United States Patent
Patino et al.

(10) Patent No.: US 6,819,083 B1
(45) Date of Patent: Nov. 16, 2004

(54) DUAL USE THERMISTOR FOR BATTERY CELL THERMAL PROTECTION AND BATTERY PACK OVERCHARGE/UNDERCHARGE PROTECTION

(75) Inventors: Joseph Patino, Pembroke Pines, FL (US); Michael D. Geren, Suwanee, GA (US)

(73) Assignee: Motorola, Inc., Schaumburg, IL (US)

( * ) Notice: Subject to any disclaimer, the term of this patent is extended or adjusted under 35 U.S.C. 154(b) by 45 days.

(21) Appl. No.: 10/424,017

(22) Filed: Apr. 25, 2003

(51) Int. Cl.$^7$ .................. H01M 10/44; H01M 10/46
(52) U.S. Cl. .................................. 320/134; 320/150
(58) Field of Search ........................ 320/127, 128, 320/134, 136, 150

(56) References Cited

U.S. PATENT DOCUMENTS

| | | | |
|---|---|---|---|
| 5,602,460 A | | 2/1997 | Fernandez et al. |
| 5,912,546 A | * | 6/1999 | Sakou et al. ............... 320/134 |
| 5,963,019 A | * | 10/1999 | Cheon ....................... 320/150 |
| 6,020,721 A | * | 2/2000 | Brotto ....................... 320/150 |
| 6,152,597 A | * | 11/2000 | Potega ....................... 374/185 |
| 6,160,381 A | * | 12/2000 | Peterzell .................... 320/134 |

\* cited by examiner

*Primary Examiner*—Edward H. Tso
(74) *Attorney, Agent, or Firm*—Akerman Senterfitt

(57) ABSTRACT

A protection circuit (100) for use with a battery operated device (50) which includes an over temperature detector (110), a controller (130), and a voltage divider circuit (102 and 106). The voltage divider circuit includes a multi-use thermistor (102) for monitoring a temperature of a battery cell (104), a battery charger, or a battery operated device. Further, the thermistor can be operatively connected to the over temperature detector. An input voltage at the input (114) of the over temperature detector can vary relative to a variance in the monitored temperature. The temperature detector can signal the controller to terminate the charging of the battery cell if the temperature exceeds a predefined value. The device discharge detector can signal the controller to terminate the discharging of the battery cell if the battery operated device determines a specific event such as water intrusion, circuit failure or a software problem.

18 Claims, 2 Drawing Sheets

DUAL USE THERMISTOR FOR BATTERY CELL THERMAL PROTECTION AND BATTERY PACK OVERCHARGE/UNDERCHARGE PROTECTION

CROSS-REFERENCE TO RELATED APPLICATIONS

Not applicable

FIELD OF THE INVENTION

This invention relates generally to battery recharging, and more particularly to systems for rechargeable battery cells.

BACKGROUND OF THE INVENTION

Lithium-ion batteries are preferred over other types of rechargeable batteries, such as nickel-cadmium batteries and nickel metal-hydride batteries, for portable electronics applications because of their light weight and high energy density. Lithium-ion batteries, however, are very sensitive to overcharging and safety is a concern with their use. For example, metallic lithium may plate onto an electrode within the battery cell should the battery cell become overcharged. The plated lithium can pose a fire hazard due to the flammable nature of metallic lithium. Another safety concern involves the venting of noxious fumes when the temperature of the battery cell becomes too high. Furthermore, an over-discharge condition can result in a change in the chemical composition of the electrolyte in the battery cell, which can significantly shorten the life of the battery cell.

A battery cell may also be irreparably damaged by water intrusion. In particular, the water can short circuit components of the circuit which are connected to the battery cell. The short circuit condition can result in a current surge from the battery cell, which can damage the circuit components and cause a catastrophic failure in the battery cell itself. Hence, it is important to have a battery protection system that accurately monitors battery cells and ensures that they operate within safe parameters.

SUMMARY OF THE INVENTION

The present invention relates to a protection circuit for use with a battery operated device. The protection circuit can be incorporated into a battery or battery pack, a battery charging device or the battery operated device. The battery operated device can be for example a radio, a cellular telephone, a cordless telephone, a cordless tool, a video recording device, an audio recording device, a camera, a cordless shaver, a cordless toothbrush or a toy.

The protection circuit can include an over temperature detector, a controller, and a voltage divider circuit. The voltage divider circuit can include at least a multi-use thermistor for monitoring a temperature of the battery cell (or cells), the battery charger, or the battery operated device. Upon the monitored temperature exceeding a predefined value, the over temperature detector can signal the controller to terminate the charging and/or discharging of the battery cell or cells. It should be understood within contemplation of the present invention that the "predefined value" for a voltage or a temperature can be understood as a predefined value range of voltages or temperature. It should also be understood that the present invention is applicable to both single cell and multi-cell batteries or battery packs, and the subsequent use of "battery", "battery cell", or "battery pack" should be interpreted in this context. Further, a temperature monitor can be operatively connected to the thermistor to output a temperature value derived from a voltage applied across the thermistor. The voltage divider circuit also can include a resistor which can be disposed in the battery operated device.

The protection circuit also can include an overcharge detector and a first logic gate. The first logic gate, which can be an OR gate, can have an output operatively connected to the controller, a first input operatively connected to an output of the over temperature detector, and a second input operatively connected to an output of the overcharge detector. The first logic gate can signal the controller to terminate charging of the battery cell upon the occurrence of the first logic gate receiving a signal from the over temperature detector or the overcharge detector.

The protection circuit can further include a device discharge detector, wherein the device discharge detector signals the controller to terminate discharging of the battery cell if a voltage applied to the battery operated device from the battery cell is less than a predefined value. The device discharge detector also can terminate the discharging of the battery cell upon the occurrence of a specified condition, such as water intrusion into the battery operated device or battery cell pack, an internal circuit failure within the battery operated device, a software failure within the battery operated device, or a software failure external to the battery operated device.

An over discharge detector and a second logic gate, which can be an AND gate, can be included. The second logic gate can have an output operatively connected to the controller, a first input operatively connected to an output of the device discharge detector, and a second input operatively connected to an output of the over discharge detector. The second logic gate can signal the controller to terminate charging of the battery cell upon the second logic gate receiving a signal from the over temperature detector or the overcharge detector.

The present invention also can include a method of providing device protection for a battery operated device. The method can include the step of monitoring a voltage of at least one battery cell. Further, the temperature of the battery cell, a battery charger, or the battery operated device can be monitored using a thermistor. The thermistor can be used to monitor a voltage applied to, or supplied from, a battery protection circuit. The charge and/or discharge of the battery cell can be terminated upon the monitored temperature exceeding a predefined value. The method also can include the steps of terminating the charge and/or discharge of the battery cell upon a voltage applied to, or supplied from, a battery protection circuit being too high or too low. The charge and/or discharge also can be terminated if the voltage measured at the battery cell is too high or too low.

DETAILED DESCRIPTION OF THE DRAWINGS

The present invention relates to a protection circuit for use with a battery operated device (device), for example in a battery cell pack. The protection circuit includes a voltage divider circuit comprising a multi-use thermistor (thermistor) for over temperature, over-voltage and under-voltage detection. In particular, the thermistor can be used to detect an over temperature condition in the device, one or more battery cells supplying energy to the device, and/or a battery charging device supplying energy to the battery cell pack. The thermistor also can provide a voltage value correlating to a voltage which is applied to the device or received from the battery charging device. Accordingly, the thermistor can cause the protection circuit to terminate charge and/or discharge of the battery should an over-voltage, under-voltage or over temperature condition occur. Notably, the use of the thermistor to provide circuit protection against multiple undesirable conditions enables a circuit designer great flexibility in designing a protection circuit which is high performance, yet low cost. The thermistor is also used by the device (such as a radio) to monitor the battery temperature for example via an A/D input (see analog to digital converter 170 in FIG. 1).

Figure 1:
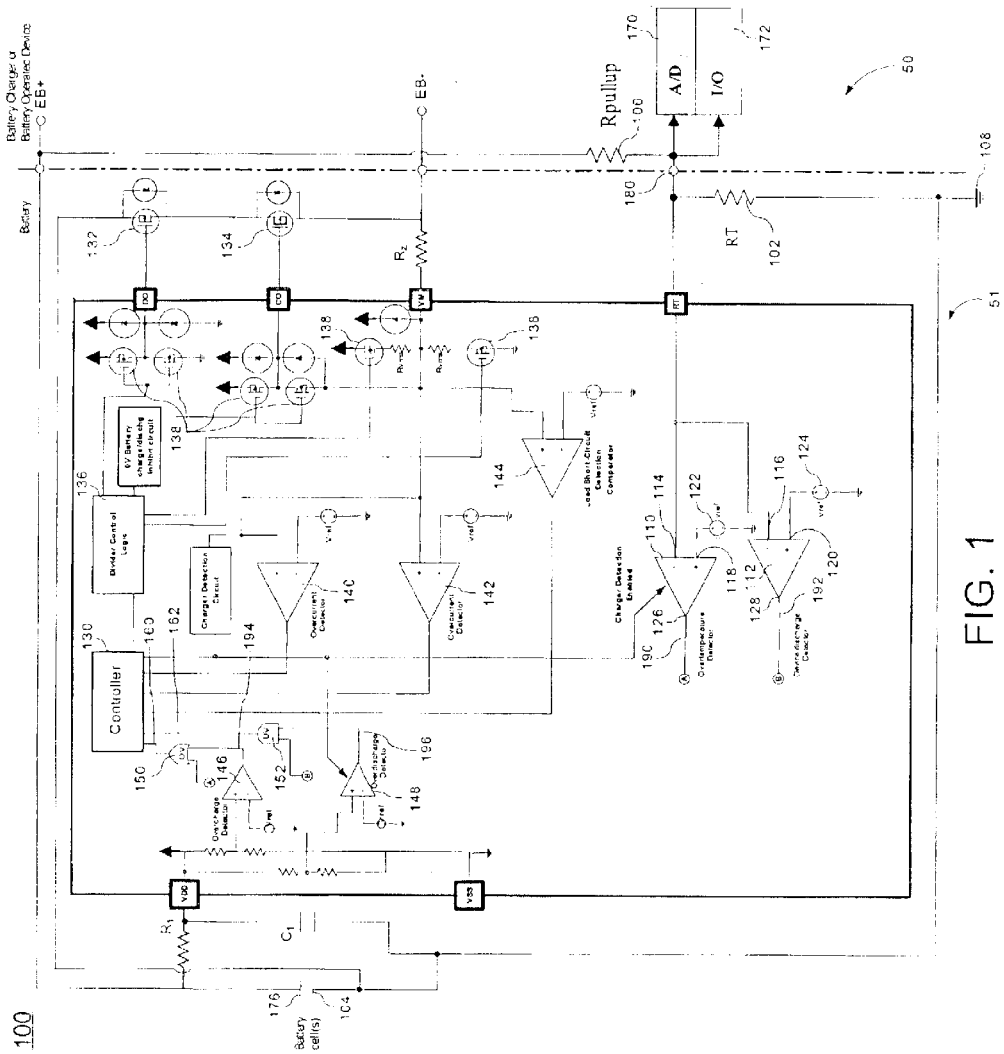
FIG. 1 is a schematic diagram of a protection circuit for use in a battery operated device dance with the present invention.

Referring to FIG. 1, a schematic diagram of a protection circuit 100 for use with a battery 51 and a battery operated device or battery charger 50 is shown. The protection circuit 100 can include a multi-use thermistor (thermistor) 102. The thermistor 102 can be any thermally sensitive resistor that has a resistance value which varies with a change in temperature. The thermistor 102 can have a positive temperature coefficient or a negative temperature coefficient. In a preferred arrangement, the thermistor 102 exhibits a predictable change in electrical resistance when subjected to a corresponding change in temperature.

The thermistor 102 can be disposed proximate to one or more battery cells 104, proximate to battery operated device and/or a battery charger 50. The thermistor 102 can be connected in series with a pullup resistor 106 between the battery positive voltage terminal (positive terminal) 176 and chassis ground 108. Accordingly, the thermistor 102 and the pullup resistor 106 can form a voltage divider circuit. In the arrangement shown, the pullup resistor 106 can be contained in the device 50. Nonetheless, the invention is not so limited. For instance, the pullup resistor 106 can be contained in a battery charger or a battery, proximate to the thermistor 102, or proximate to the other components of the protection circuit 100.

As shown, the pullup resistor 106 has a low impedance connection to the positive terminal 176, and the thermistor 102 has a low impedance connection to chassis ground 108. Nonetheless, the relative positions of the thermistor 102 and the pullup resistor 106 can be different. For example, the thermistor 102 can have a low impedance connection to the positive terminal 176, and the pullup resistor 106 can have a low impedance to chassis ground 108 (in which case the pullup resistor 106 could be referred to as a pulldown resistor). Additional resistors also can be added to the voltage divider circuit, and any other suitable circuit arrangements can be implemented so long as the thermistor 102 can be monitored to detect a temperature of a battery cell, battery charger, or device being monitored.

If the thermistor 102 has a positive temperature coefficient, the voltage drop across the thermistor 102 will increase as the temperature of the body of the thermistor 102 increases. If the thermistor 102 has a negative temperature coefficient, the voltage drop across the thermistor 102 will decrease as the temperature of the body of the thermistor 102 increases. In either case, the voltage drop across the thermistor 102 can be monitored and an over temperature signal can be generated if the temperature of the body of the thermistor 102 should become higher than acceptable.

The protection circuit also can include an over temperature detector 110 and a device discharge detector 112. The over temperature detector 110 and the device discharge detector 112 each can be any suitable circuit configured to monitor the voltage drop across the thermistor 102 and generate an output signal if the voltage drop is less than and/or greater than a pre-defined value. For example, the detectors 110, 112 can be comparator circuits which include operational amplifier circuitry. Such circuits are known to the skilled artisan. In the exemplary arrangement shown, each detector 110, 112 can have a respective first input 114, 116 operatively connected to the junction of the thermistor 102 and the pullup resistor 106 at node 180, and each detector 110, 112 can have a respective second input 118, 120 operatively connected to respective reference voltages 122, 124. Further, the detector 110 can include an output port 126 for outputting a first detector output signal 190 indicating whether the voltage drop across the thermistor 102 is greater than or less than the reference voltage 122, and the detector 112 can include an output port 128 for outputting a second detector output signal 192 indicating whether the voltage drop across the thermistor 102 is greater than or less than the reference voltage 124.

The output ports 126, 128 can be operatively connected to a controller 130. The controller 130 can be any circuit device suitable for controlling the operation of other circuit components. For example, the controller 130 can be a processor which generates control signals to control the operation of transistors, such as a field effect transistor (FET) 132 and a FET 134. The controller 130 can activate FEE 132 to enable discharge of the battery cell 104, for instance to provide power to a device. Further, the controller 130 can activate FET 134 to charge the battery cell 104. Moreover, the controller 130 can deactivate FET 132 and/or FET 134 to terminate discharge and/or charge of the battery cell 104 respectively as required. Suitable circuitry can be disposed between the controller 130 and FET's 132, 134, as would be known to the skilled artisan. For example, divider logic control 136 and FET's 138 can be provided. Nonetheless, the present invention is not so limited.

The controller 130 also can receive input signals generated by other circuit components. The controller 130 can evaluate such input signals when generating the control signals for controlling circuit components, such as FET's 132, 134. For instance, the controller 130 can receive signals generated by over-current detectors 140, 142, short circuit detector 144, overcharge detector 146, and over-discharge detector 148. Again, the controller 130 can deactivate FET 132 and/or FET 134 to terminate discharge and/or charge of the battery cell 104 if an undesirable condition is detected by any of such detectors.

The protection circuit 100 also can include logic gates 150, 152, which can enable controller input lines 160, 162 to each monitor more than one detector. The logic gates 150, 152 can be AND, OR, NANDP, NOR, XAND, XOR or any other suitable logic gates. For example, logic gate 150 can be an OR gate having a first input to receive the first detector output signal 190 from the over temperature detector 110 and a second input to receive a third detector output signal 194 from the overcharge detector 146. Under normal operating conditions, the first and third detector output signals 190, 194 can be low, and thus the output of the logic gate 150 can be low. If the overcharge detector 146 detects an overcharge condition on the battery 104, for instance by detecting the voltage of the battery cell to be higher than a reference maximum voltage, the overcharge detector 146 can be triggered high, thereby triggering the output of the logic gate 150 to be high, and thus signaling to the controller 130 turn off FET 134 and terminate charging of the battery cell 104. The reference maximum voltage can be a maximum safe charge voltage for the battery cell 104. For example, the maximum reference voltage can be 4.35 volts. Further, if the over temperature detector 10 detects a voltage across the thermistor 102 which is higher than a reference maximum voltage, such as reference voltage 122, the first detection output signal generated by the over temperature detector 110 can be triggered high, thus triggering the output of the logic gate 150 to be high, and again signaling the controller to turn off FET 134.

At this point it should be noted that an excessive voltage across the thermistor 102 can be indicative of a battery charger outputting a charge voltage to the protection circuit 100 which exceeds a pre-defined maximum voltage. The excessive voltage across the thermistor 102 also can be indicative of an over temperature condition in the battery cell(s), the battery charger, or the device. Accordingly, a temperature monitor can be operatively connected to the thermistor 102. The temperature monitor can measure the voltage across the thermistor 102 and output a temperature value derived from the measured voltage.

In one arrangement, the logic gate 152 can be an AND gate having a first input for receiving the second detector output signal 192 from the device discharge detector 112 and a second input for receiving a fourth detector output signal 196 from over discharge detector 148. Under normal operating conditions, the second and fourth detector output signals 192, 196 can be high, and thus the output of the logic gate 152 can be high. If the over discharge detector 146 detects that the voltage of the battery cell 104 is less than a reference voltage minimum, the output of the over discharge detector 146 can be triggered low, thereby triggering the logic gate 152 to go low and signaling the controller 130 to turn off FET 132 to terminate discharging of the battery cell 104. The reference voltage minimum can be a minimum voltage level to which it is safe to discharge the battery cell 104 without causing damage to the battery cell 104. For example, the reference voltage minimum can be 2.4 volts. Likewise, if the device discharge detector 112 detects a voltage across thermistor 102 which is less than a minimum reference voltage, the output of the device discharge detector 112 can be triggered low, and again signaling the controller 130 to turn off FET 132.

A variety of conditions can cause the voltage across the thermistor 102 to fall below the minimum reference. For instance, the voltage can fall below the minimum reference if the voltage supplied to the device is less than a pre-defined value, which can result from faulty circuitry or a battery which has been over discharged. Further, analog to digital converter (A/D) 170 or input/output module (I/O) 172 can be operatively connected to external fault detection sensors. For instance, I/O 172 can be connected to a water intrusion detector. If water intrusion is detected within the device, the I/O 172 can trigger the voltage at node 180 to go low, thereby triggering the output of the device discharge detector 112 to go low, and thus reducing the voltage across the thermistor 102. Furthermore, the I/O 172 can be operatively connected to external sensors and/or circuitry which cause the voltage at node 180 to go low or high under certain circumstances. For instance, external circuitry can cause the I/O 172 to trigger the voltage at node 180 to go low if a fault occurs in the device, for example a circuit failure, or if a software problem occurs. The software problem can be internal to the device or external to the device. Thus, the single node 180 (and thermistor) can be used for multiple purposes such as over-temperature control by the circuit 100, temperature monitoring by the device 50, triggering a temperature event by the device 50 on the circuit 100 by forcing an over-temperature event to stop charging of the battery 51, or triggering an over-discharge event by the device 50 on the circuit 100 to disconnect the battery 51 from the device 50 such as when the device 50 detects water intrusion, a circuit failure or a software problem.

Figure 2:
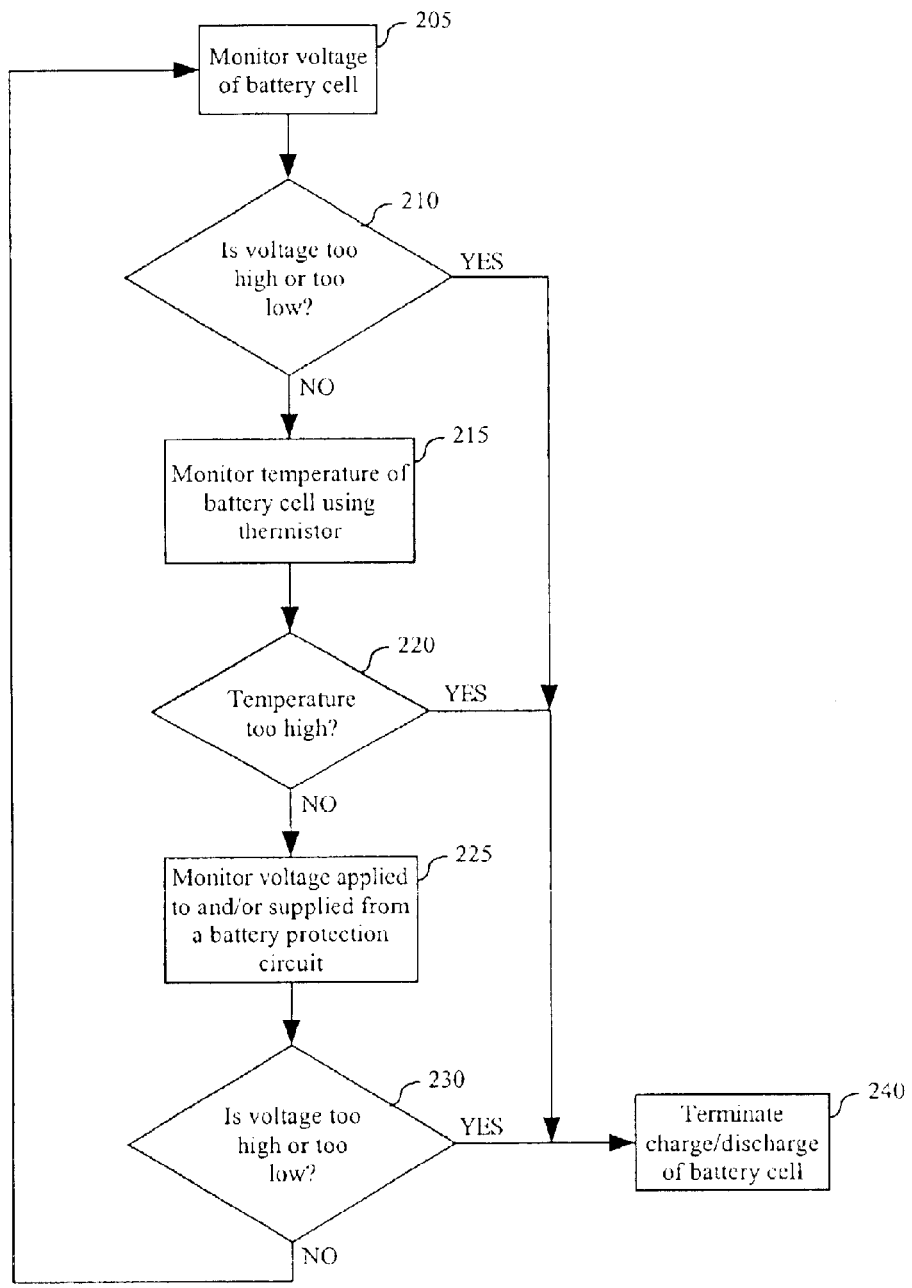
FIG. 2 is a flow chart illustrating a method of providing battery protection in accordance present invention.

Referring to FIG. 2, a flow chart 200 illustrating a method of providing battery protection in accordance with the present invention is shown. Beginning at step 205, the voltage of one or more battery cells can be monitored. If the voltage of the battery cell or cells is higher than a predetermined maximum value or lower than a predetermined minimum value, the charge and/or discharge of the battery cell can be terminated, as shown in decision box 210 and step 240. The temperature of the battery cell also can be monitored using a thermistor, as shown in step 215. Further, the temperature of other components can be monitored as well. For example, the temperature of a battery operated device or a battery charger can be monitored. Regardless of whether the battery cell, battery charger or battery operated device is monitored, charge and/or discharge of the battery cell can be terminated if the temperature exceeds a predetermined value, as shown in decision box 220 and step 240. Continuing at step 225, the thermistor also can be used to monitor the voltage applied to, or supplied from, a battery protection circuit. Continuing to step 230, if the voltage is too high or too low, the charge and/or discharge of the battery can be terminated. The process can continue until the battery cell, battery operated device, or battery charger experiences a condition such as over temperature, over voltage, or under voltage. The process can also terminate if the protection circuit is turned off. For example, the protection circuit can be automatically turned off when the device is turned off.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A protection circuit for use with a battery operated device, comprising:
    an over temperature detector;
    a controller; and
    a voltage divider circuit comprising at least a multi-use thermistor for monitoring a temperature of at least one of a battery cell, a battery charger, and said battery operated device, said multi-use thermistor being disposed proximate to said at least one of a battery cell, a battery charger, and said battery operated device, and said multi-use thermistor being operatively connected to an input of said over temperature detector;
    wherein an input voltage at said input of said over temperature detector varies relative to a variance in said temperature of said at least one of a battery cell, a battery charger, and said battery operated device, said over temperature detector signaling said controller to terminate at least one event selected from the group consisting of charging of said battery cell and discharging said battery cell upon said temperature of said at least one of a battery cell, a battery charger, and said battery operated device exceeding a predefined value.

2. The protection circuit according to claim 1, wherein said over temperature detector signals said controller to terminate charging of said battery cell upon a battery charge voltage being received by said protection circuit which is greater than or less than a predefined value.

3. The protection circuit according to claim 1, further comprising a temperature monitor operatively connected to said thermistor, said temperature monitor outputting a temperature value correlating to said temperature of said at least one of a battery cell, a battery charger, and said battery operated device, said temperature value being derived from a voltage applied across said thermistor.

4. The protection circuit according to claim 1, wherein said voltage divider circuit further comprises a resistor.

5. The protection circuit according to claim 4, wherein said resistor is disposed in said battery operated device.

6. The protection circuit according to claim 1, further comprising an overcharge detector and a first logic gate, said first logic gate having an output operatively connected to said controller, a first input operatively connected to an output of said over temperature detector and a second input operatively connected to an output of said overcharge detector, wherein said first logic gate signals said controller to terminate charging of said battery cell upon the occurrence of said first logic gate receiving a signal from at least one of said over temperature detector and said overcharge detector.

7. The protection circuit according to claim 6, wherein said first logic gate is an OR gate.

8. The protection circuit according to claim 1, further comprising a device discharge detector, wherein said device discharge detector signals said controller to terminate discharging of said battery cell if a voltage applied to said battery operated device from said battery cell is less than a predefined value.

9. The protection circuit according to claim 8, wherein said device discharge detector signals said controller to terminate discharging of said battery cell upon the occurrence of at least one specified condition, said specified condition selected from the group consisting of water intrusion into at least one of said battery operated device and a battery cell pack, an internal circuit failure within said battery operated device, a software failure within said battery operated device, and a software failure external to said battery operated device.

10. The protection circuit according to claim 8, further comprising an over discharge detector and a second logic gate, said second logic gate having an output operatively connected to said controller, a first input operatively connected to an output of said device discharge detector and a second input operatively connected to an output of said over discharge detector, wherein said second logic gate signals said controller to terminate charging of said battery cell upon the occurrence of said second logic gate receiving a signal from at least one of said over temperature detector and overcharge detector.

11. The protection circuit according to claim 10, wherein said second logic gate is an AND gate.

12. The protection circuit according to claim 1, wherein said battery operated device is at least one device selected from the group consisting of a radio, a cellular telephone, a cordless telephone, a cordless tool, a video recording device, an audio recording device, a camera, a cordless shaver, a cordless toothbrush and a toy.

13. The protection circuit according to claim 1, wherein said protection circuit is incorporated into at least one device selected from the group consisting of said battery pack, said battery charging device and said battery operated device.

14. A protection circuit for use with a battery operated device, comprising:

an over temperature detector;

a device discharge detector;

a controller; and a voltage divider circuit comprising at least a multi-use thermistor for monitoring a temperature of at least one of a battery cell, a battery charger, and said battery operated device, said multi-use thermistor being disposed proximate to said at least one of a battery cell, a battery charger, and said battery operated device and being operatively connected to an input of said over temperature detector;

wherein an input voltage at said input of said over temperature detector varies relative to a variance in said temperature of said at least one of a battery cell, a battery charger, and said battery operated device, said over temperature detector signaling said controller to terminate charging of said battery cell upon said temperature of said at least one of a battery cell, a battery charger, and said battery operated device exceeding a predefined value, and said device discharge detector signals said controller to terminate discharging of said battery cell if a voltage applied to said battery operated device from said battery cell is less than a predefined value.

15. A method of providing device protection for a battery operated device, comprising the steps of:

monitoring a voltage of at least one battery cell;

using a thermistor, monitoring a temperature of at least one of said battery cell, a battery charger, and said battery operated device;

using said thermistor, monitoring at least one of a voltage applied to a battery protection circuit and a voltage supplied from said battery protection circuit; and terminating at least one of a charge and a discharge of said battery cell upon said temperature varying from a predefined value.

16. The method of claim 15, further comprising the step of terminating at least one of a charge and a discharge of said battery cell upon said at least one of a voltage applied to a battery protection circuit and a voltage supplied from said battery protection circuit being a voltage value which varies from a predefined value.

17. The method of claim 15, further comprising the step of terminating at least one of a charge and a discharge of said battery cell upon a measured voltage of said battery cell being a voltage value which varies from a predefined value.

18. The method of claim 15, wherein the method comprises the steps of controlling over-temperature by the battery protection circuit, temperature monitoring by the battery operated device, triggering a temperature event by the battery operated device on the battery protection circuit by forcing an over-temperature event to stop charging of the at least one battery cell, and triggering an over-discharge event by the battery operated device on the battery protection circuit to disconnect the at least one battery cell from the battery operated device when the battery operated device detects at least one among the events of water intrusion, a circuit failure and a software problem.

* * * * *